May 25, 1965   J. HUNEGS   3,185,345
DISPENSING CONTAINER WITH CONTENTS INDICATOR
Filed Jan. 24, 1963

United States Patent Office 3,185,345
Patented May 25, 1965

3,185,345
DISPENSING CONTAINER WITH CONTENTS INDICATOR
James Hunegs, Minneapolis, Minn., assignor to The Gillette Company, Boston, Mass., a corporation of Delaware
Filed Jan. 24, 1963, Ser. No. 253,676
2 Claims. (Cl. 222—45)

This invention relates to a container for holding and dispensing semifluid or paste-like materials. More particularly it relates to such a dispensing container having an external indicator for showing the quantity of material still in the container after a portion of the contents has been dispensed.

One object is to provide a receptacle for holding materials to be dispensed, a sliding plunger in the receptable actuated by a control member to expel material from the container and having an indicator presenting external indication of the proportion of the original contents of the receptacle still remaining to be dispensed.

Another object is to provide a dispensing container of the type described in which all of the moving parts accessible from outside the container are mounted for rotative movement or axial movement along the general confines of the outer shell or body, so that the overall dimensions of the container do not change during dispensing operation.

Still another object is to provide, in a dispensing container of the sliding plunger type, an indicator that is one-way or non-reversible and that shows externally the amount of material remaining to be dispensed by indicating the furthest forward position of the plunger within the receptacle, this indication not being changed by reverse movement of the plunger.

A further object is to provide a dispensing container of the type or character above described which is extremely simple in construction and in which the visible contents indication is provided by the addition of but a single inexpensive part and other parts of the container already present are simply modified slightly.

Other objects, advantages and details of that which is believed to be novel and included in this invention will be clear from the following description and claims, taken with the accompanying drawing in which is illustrated an example of dispensing container embodying the present invention and incorporating the improved indicator.

Figure 1:
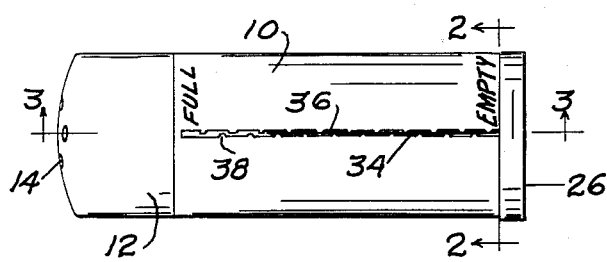
FIG. 1 is a side view or elevation of a dispensing container according to the invention.

In carrying out the objects of this invention, in one embodiment thereof a generally elongated receptacle 10 is provided for holding or containing semifluid paste or cream which is to be dispensed therefrom. At one open end of the container a separate top member 12 is mounted, this top having a dispensing outlet formed as a plurality of small holes 14. The top member may be cemented or otherwise secured on the open end of the receptacle after the same has been filled with material to be dispensed therefrom. If desired, a cap or closure may be provided to cover the top member and seal the holes 14 when the device is not in use.

Within the receptacle, here shown as in the form of a hollow cylinder, is a plunger or piston 16 having a flexible resilient peripheral flange 18 thereon which seats closely against the inside of the receptacle but which is slidable therein. Inwardly projecting longitudinal guiding ribs 20 on the inside of the receptacle may engage in cooperating grooves in the sides of the piston so as to prevent relative rotation between the piston and receptacle while permitting sliding movement.

The piston or plunger has a central internally threaded collar 22 thereon into which is screwed a threaded shaft 24 for propelling the plunger. A knob 26 on the lower end of the shaft is provided with a knurled edge so that the knob and connected shaft may be rotated. Together the knob and shaft constitute a rotatable control member which governs the position of the piston or plunger in the receptacle.

The base of the receptacle has an end wall 28 thereon in the center of which are provided integral inwardly slanting flexible fingers 30 having sufficient resilience to snap over and engage against one side of an annular bearing shoulder 32 near the bottom of the threaded shaft 24. In use, the tips of the spring fingers 30 act to support the shaft and knob unit in proper longitudinal position with respect to the receptacle while this control member and the receptacle are rotated one with respect to the other.

Figure 2:
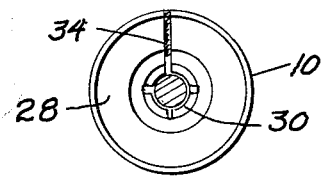
FIG. 2 is a transverse section through the container of FIG. 1 substantially on the line 2—2 thereof or an end view as if before assembly of the plunger control member thereon.
Figure 3:
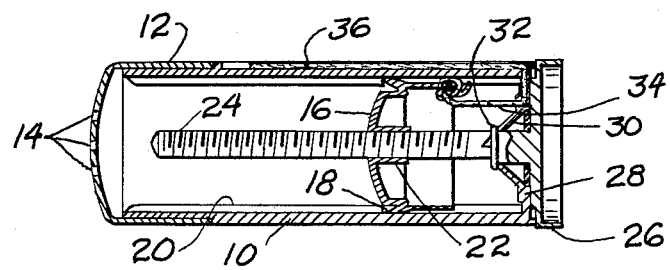
FIG. 3 is a longitudinal section through the container of FIG. 1 on the line 3—3 thereof.

All of the above elements or their equivalents may be found in dispensing containers of the sliding plunger type at present available, but because of the opaque nature of the material used for the receptacle, a person using such a container cannot know how much material has been dispensed or how much remains within the container for future use. In order to give the user some outwardly visible indication of the position of advance of the plunger in the receptacle, which will show how much material remains to be dispensed, the present invention provides an elongated flexible member 34, shown here as a piece of string, preferably so colored as to contrast with the color of the material forming the outside of the receptacle. As seen in FIGS. 2 and 3, one end of the string is knotted or otherwise firmly secured to the underside of the plunger and the string is extended down through the end wall 28 of the receptacle, passing between two of the spring fingers 30, then radially outwardly of the receptacle between the end wall and the knob, and finally passes longitudinally along the outside of the receptacle with its free end extending toward the top member 12, with its outlet holes 14 the portion outside of the receptacle being housed preferably in an open guiding groove 36 extending on the outside of the container. A radially extending groove or guide communicating with the groove 36 may be provided in the end wall 28. The free end of the string is lightly held by friction in the groove 36 but is capable of sliding lengthwise therein when enough force is applied to overcome the light friction. As shown, the string may be held in groove 36 by means of alternately overlapping projecting teeth 38 at the top edges of the groove, these teeth being spaced apart sufficiently to provide viewing openings 40 therebetween. If desired, instead of the teeth, the string might be frictionally held in the guiding groove by means of a transparent portion of a label surrounding the container and covering the groove, such transparent labels being well known in the art. In either event, on the outside of the container one end of the groove may be provided with a marking, "FULL," and the other end of the groove may be provided with the indicia "EMPTY." As should be obvious, the free or indicating end of the string will lie opposite one or the other of these indicia or in some intermediate position, depending upon the position of the plunger within the receptacle. Because of the light frictional holding of the flexible indicator on the outside of the receptacle, the container may be used in any position and still give a good indication of the contents.

In assembling and filling the dispensing container above described, the flexible indicating string is first secured to the plunger, the plunger is inserted in the container through its open end and moved to its bottom end, the string threaded through the bottom of the receptacle and into the full length of the groove on the outside of the receptacle. Excess string is cut off. The shaft and knob control member is then threaded into the plunger without moving the plunger until the annular shoulder 32 snaps over the tips of the spring fingers 30, completing the assembly with the plunger in full retracted position and the indicator in full extended position. Material is then loaded to fill the receptacle above the plunger and the top member is secured in place. The device is then ready for use.

As shown, the shaft is provided with a left-hand thread cooperating with the internal thread on the plunger so that as the knob is turned clockwise with respect to the receptacle the plunger will be advanced or driven upwardly, causing the material to be forced and dispensed through the outlet holes in the end or top member. As the plunger is driven it pulls the string and the free end of the string will be withdrawn in the groove a similar distance from the "FULL" indicia and, because of its contrasting color, the amount of material remaining in the container will be readily indicated by the string.

It should be noted that even if the plunger is retracted by reversing the direction of rotation of the knob, as might be done to prevent oozing of excess material between uses of the dispenser, the indicator will not follow this reverse movement of the plunger. This is so because when the plunger is backed up the flexible indicating string element will simply become slack within the container and its outer free end will be frictionally held in the groove to continue giving a true indication of the amount of material remaining. When the plunger is again advanced beyond its previous most forward position, the slack will be taken up and the outer indicating end of the string moved as more of the contents are dispensed. This non-reversible indicator is advantageous because the container is not intended to be refilled but will be thrown away when its contents have been exhausted.

Figure 4:
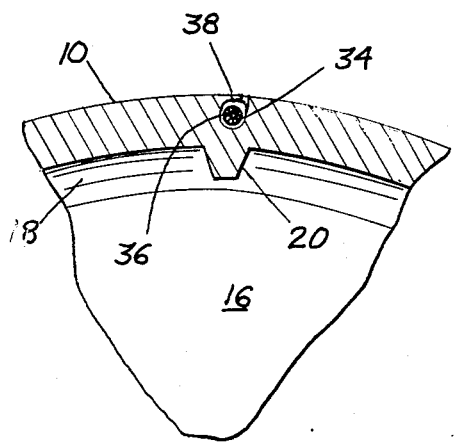
FIG. 4 is a greatly enlarged transverse section through a segment of the side wall of the container of FIG. 1.
Figure 5:
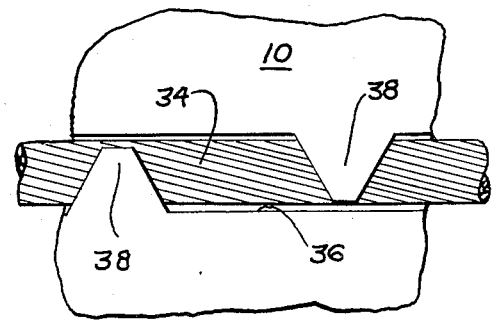
FIG. 5 is a further magnified elevational view of a fragment of the container of FIG. 1.

As shown in FIG. 4 the groove 36 may be arranged radially outwardly of one of the plunger guiding ribs 20 so that the wall of the container at that point is not unduly weakened by the presence of the groove. Preferably the entire dispenser is manufactured of synthetic plastic materials by conventional molding apparatus, and it will be seen that the parts may be assembled with a minimum of labor. The shaft and knob control member may be formed as an integral one-piece unit, the receptacle as another, the plunger as another piece and the top or end member as another, making but four main pieces, not including the flexible indicator or string. A washer may be used between the relatively rotatable parts if needed.

Although but one specific embodiment of the invention has been shown and described above, it is not intended to limit the invention solely thereto, but to include all obvious variations, modifications and equivalents coming within the spirit and scope of the appended claims.

What is claimed and is desired to be secured by Letters Patent of the United States is:

1. In a receptacle comprising a container for holding material to be dispensed,
   having a dispensing outlet adjacent one end,
   a plunger mounted for longitudinal sliding movement within said container,
   a threaded control member rotatably mounted in said container, threadedly engaging said plunger and
   means for rotating said control member to advance said plunger toward said outlet,
   that improvement in an indicator visible externally of said container for showing by its position the total extent of travel of said plunger toward said outlet, said indicator comprising
   an elongated flexible element having one end secured to said plunger,
   a groove in the outside wall of said container,
   said flexible element extending from said plunger outside of said container and
   having an outside externally visible end lying in said groove in the outside wall of said container, and
   means frictionally holding said flexible element lightly in said groove comprising
   a plurality of spaced teeth at the edges of said groove providing viewing openings therebetween through which the position of the end of said flexible element in said groove is visible from outside the container and indicates externally the extent of advance of said plunger in said container.

2. In a receptacle comprising a container for holding material to be dispensed,
   having a dispensing outlet adjacent one end,
   a plunger mounted for longitudinal sliding movement within said container,
   a threaded control member rotatably mounted in said container, threadedly engaging said plunger and
   means for rotating said control member to advance said plunger toward said outlet,
   that improvement in an indicator visible externally of said container for showing by its position the total extent of travel of said plunger toward said outlet, said indicator comprising
   an elongated flexible element having one end secured to said plunger,
   a groove in the outside wall of said container,
   said flexible element extending from said plunger outside of said container and
   having an outside externally visible end lying in said groove in the outside wall of said container, and
   means frictionally holding said flexible element lightly in said groove comprising
   a label surrounding the container and having a transparent portion covering said groove providing a viewing area through which the position of the end of said flexible element in said groove is visible from outside the container and indicates externally the extent of advance of said plunger in the container.

References Cited by the Examiner

UNITED STATES PATENTS

| | | | |
|---|---|---|---|
| 283,137 | 8/83 | Nevius | 222—45 X |
| 1,067,596 | 7/13 | Fesler | 222—390 |
| 1,921,118 | 8/33 | Dayton et al. | 222—45 X |
| 2,284,218 | 5/42 | Livingston | 222—49 |

LOUIS J. DEMBO, *Primary Examiner.*